United States Patent Office 3,574,808
Patented Apr. 13, 1971

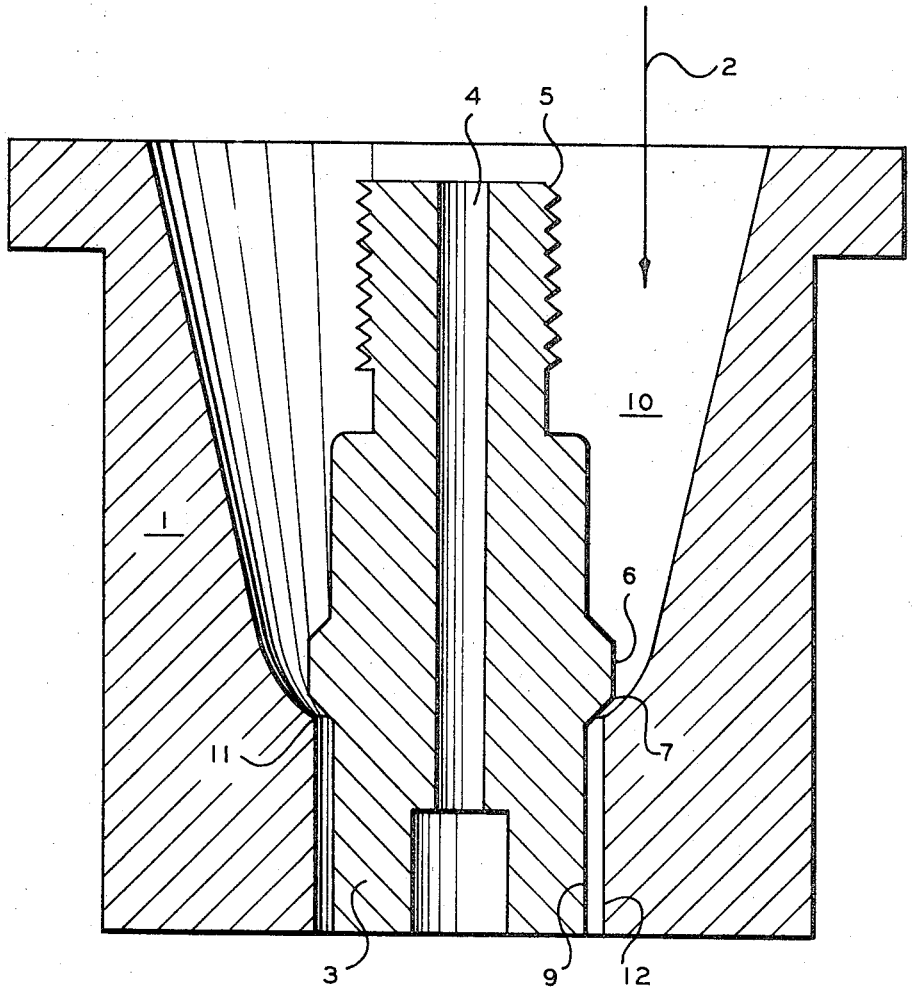

3,574,808
METHOD OF FORMING PATTERNED ARTICLES EMPLOYING DIFFERENTIAL PRESSURE

Gerald A. Matthews and Claude C. Spencer, Jr., Bartlesville, Okla., assignors to Phillips Petroleum Company
Filed Oct. 16, 1968, Ser. No. 768,144
Int. Cl. B29c 17/07; B29f 3/06
U.S. Cl. 264—98                                         10 Claims

ABSTRACT OF THE DISCLOSURE

Patterned articles are produced from heat softenable viscoelastic pseudoplastics at temperatures above their softening points by passing said materials through a restricted cross-section at a temperature above the softening point at a rate sufficient to produce turbulent flow and internal strain within said heat softenable material in excess of the critical strain rate of said material to produce patterned deformations therein and conforming the resultant patterned material to a predetermined shape at a temperature above the softening point at which the material will not flow substantially under its own weight and reducing the temperature to a point below the softening point.

BACKGROUND

Articles for many uses and of almost innumerable designs are produced from heat softenable materials which are structurally stable at ambient conditions or at conditions at which their application is intended. It is often desirable that such articles possess some aesthetic appeal or design in addition to their suitability for a particular purpose, and numerous methods have been conceived for producing designs in the surfaces of such articles for either structural or aesthetic purposes during the final stages of formation of the article itself. For example, patterned articles can be produced by either injection molding, casting, or blow molding by causing any one of numerous heat softenable, moldable materials to conform to the surface of a mold possessing the desired design or configuration. Similarly, patterns and designs have been imparted to extruded articles such as laminar sheet material or dimensionally structured extrudates by passing these products of extrusion over or through patterned rollers or similar moving surfaces at temperatures in excess of the softening point of the moldable material whereby patterns possessed by the contact surfaces are imparted to the finished article prior to complete cooling. All of these procedures which were available to the prior art require either some additional treating or surfacing step in addition to the article formation sequence or more complicated and critical fabrication conditions and apparatus design, all of which tend to increase cycle time and article expense.

It is therefore one object of this invention to provide an improved method for producing patterned articles. It is another object of this invention to provide a simple sequence of steps for continuously producing patterned articles of heat softenable materials and the articles produced thereby. It is another object of this invention to provide a method for producing molded, patterned articles of heat softenable materials which takes advantage of the fluid-dynamic properties of such materials in the fluid state. It is yet another object of this invention to provide unique patterned articles having integral designs. It is yet another object of this invention to provide articles having integral patterns of aesthetic appeal which can be produced by a simple sequence of process steps.

SUMMARY OF THE INVENTION

In one respect, this invention relates to a method for producing articles of heat softenable materials which possess an integral reoccurring pattern structure visible to an observer and which can be produced by taking advantage of the fluid-dynamic properties of these heat softenable materials in the fluid, i.e., melt, phase. These effects are obtained by taking advantage of, i.e., by at least partially retaining, the patterns, e.g., structural discontinuities, which result in a broad class of heat softenable materials when they are subjected to relatively high stresses which in turn strain, i.e., deform, the fused heat softenable material at a rate in excess of the critical strain rate of the material so that rhythmic discontinuities result in the melt. This phenomena exhibited by a broad class of compositions in the fluid state has been investigated by numerous authors who have endeavored to determine the origin of these deformations for the purpose of preventing their occurrence.

Pseudoplastics are a species of the broad class of non-Newtonian fluids which exhibit non-linear response to shear rate with regard to viscosity. The characteristics of this subclass of fluids, i.e., pseudoplastics, have been investigated in great detail by numerous authors, such as Metzner, "Non-Newtonian Technology," in Drew and Hoopes, "Advances in Chemical Engineering," volume 1, Academic Press, New York (1956); Metzner, "Flow Behavior of Thermoplastics," in Bernhardt, "Processing of Thermoplastic Materials," Reinhold, New York (1959); Wilkinson, "Non-Newtonian Fluids," Pergamon Press, New York (1960). In addition to the non-linear relationship between the shear rate and the shear stress for pseudoplastic materials, many species of that subclass also possess viscoelastic properties and exhibit elastic recovery from deformations which occur during flow. Polymeric liquids, i.e., melts and solutions, represent the largest part of this group of viscoelastic pseudoplastics. During the flow of these fluids, i.e, when they are exposed to shear, stresses are built up perpendicular or normal to the direction of flow which complement existing longitudinal, i.e., tangential, stresses in the direction of flow. These stresses result in the existence of strains in the material which are "retained" even when the shear rate, i.e., rate of deformation, exceeds the elastic limit with the result that the viscoelastic fluids respond in an attempt to conform to their configuration prior to distortion which gives rise to the elastic recovery properties of these materials. This response, i.e., elastic recovery, which is exhibited when strain rate and stress are reduced are commonly termed "end effects" and have been the subject of considerable investigation by numerous authors such as Reiner, "Deformation, Strain and Flow," Second Edition, Interscience, New York (1960); Alfrey, "Mechanical Behavior of High Polymers," Interscience, New York (1948); Metzner, "Flow Behavior of Thermoplastics," in Bernhardt, "Processing of Thermoplastic Materials," Reinhold, New York (1959); Eirich, "Rheology," volumes 1, 2 and 3, Academic Press, New York (1956, 1958, and 1960), respectively; and others.

Renfrew and Morgan, in their article "Polythene," Interscience Publishers (1960), second edition, summarize and discuss results obtained by several authors who have investigated the phenomena of melt fracture in numerous synthetic polymers which exhibit viscoelastic pseudoplastic properties such as polyethylene, polymethylmethacrylate, polytetrafluoroethylene, polystyrene, and others. These materials, i.e., viscoelastic pseudoplastics, somewhat in a manner analogous to dilatant fluids, exhibit a critical or maximum strain rate above which at least partial failure of intermolecular forces results, thereby, at least temporarily, reducing the applied stress and strain rate, below a point at which further failure results. Presumably, due to the result that such failure is not complete, a part of the strain resulting from applied stress is retained with the result that a degree of recovery is realized as the applied stress is reduced. A patterned surface structure results from this elastic recovery when the conditions at which the pseudoplastic exists are such that it possesses sufficient structural stability to retain the definition thus imparted to the surface. In other words, if the temperature of the material is so high that it will flow under the influence of its own weight and conform to a planar rather than a patterned surface after a period of time determined by the stability of the pseudoplastic, i.e., the density, viscosity, etc., the surface effects of melt fracture will not be apparent in the final product. These conditions and the factors influencing the occurrence of melt fracture in such polymers are further discussed by S. M. Barnett in his article "A Correlation for Melt Fracture" in Journal of Polymer Engineering and Science, July 1967. In that article, Barnett discusses the influence of several polymer properties on the occurrence and degree of melt fracture and develops a dimensionless representation for a hypothetical melt fracture number in a manner analogous to the expression of Reynolds numbers employed in the definition of tranient fluid characteristics. In this endeavor, Barnett discusses the work of several other authors in this field of pseudoplastic behavior as well as his own investigation of polymers such as polypropylene, poly(dimethylsiloxane), polyvinylchloride, polystyrene, and the like.

We have found, however, that through judicious choice of operating conditions such as temperature and flow rate, depending, of course, on the response of the pseudoplastic employed to these variables, extruded products can be formed which have highly patterned, attractive surfaces and that these intermediate products can then be formed into finished articles by blow molding, free-blowing, casting, and the like to form articles such as containers, film, sheetstock, etc. which possess regularly patterned deformations on at least one surface which gives an aethetic appearance to the finished product. We have also found that in the alternative the extruded melt fractured intermediate material can be cooled or quenched in the shape of a preform such as sheetstock or a blow molding parison and then subsequently reheated to a temperature below the melting point and preferably only slightly above the softening point and conformed to the desired shape by blow molding, casting, free-blowing and the like. The temperature at which the finished article is produced must, at least in the initial stages of fabrication, exceed the softening point of the material, but must be below the temperature at which the material will flow substantially under the influence of its own weight during the period that is required for its formation and before it can be cooled in the final desired configuration.

Every heat softenable material that exhibits shear failure and elastic recovery can be treated by this method to produce finished articles having patterned surfaces. Exemplary of materials from which the articles of this invention can be produced by this method are natural and synthetic elastomers and thermoplastics. Exemplary of synthetic elastomers and thermoplastics presently preferred are polymers, i.e., homo-, co-, terpolymers, etc., of at least one olefin monomer, preferably alpha-1-olefins having from 2 to 8 carbons atoms, conjugated diolefins having from 4 to 12 carbon atoms, styrene, and other vinyl substituted aromatics, polyesters, e.g., polyacetates, polyureas, polyamides, e.g., nylons, and the like.

Although all of these polymers possess the characteristics necessary to produce finished articles having patterned surfaces by this method, there are considerations relating to other characteristics of particular polymers which make certain of them less preferable in these applications. For example, the polymer should have sufficient chemical stability to withstand the extreme conditions of temperature and shear rate to which it is necessarily subjected in order to create the described effect, i.e., melt fracture. Exemplary of polymers that are subject to degradation at these extreme conditions are polyvinyl chloride and copolymers of vinylidene chloride with alphaolefins and polycarbonates. However, if molecular weight degradation and discoloration can be tolerated, these polymers could be employed to produce the articles of this invention in that they exhibit elastic recovery and are subject to failure at specific critical strain rates. The heat softenable material should also exhibit sufficient melt strength to retain its configuration as well as to preserve the described surface deformations. For example, some polyamides might not be preferable for blow molding applications due to the fact that they exhibit relatively low melt viscosities at processing conditions and thus exhibit excesive thinning.

As already mentioned, the conditions to which the polymers must be exposed in order to achieve and retain the pattern of repetitive surface deformations and to produce finished articles from the resulting materials very considerably depending upon the type of polymer employed. The nature of the monomer units, polymer molecular weight and molecular weight distribution, the degree of crosslinking and branching, i.e., side chain formation, all influence the conditions at which melt fracture occurs.

Polymer structure appears to affect elastic recovery. There seems to be two different strain recovery mechanisms involved depending upon whether the polymer is branched or linear. Branched polymers (at least polyolefins) appear to exhibit relatively little long chain entanglement because of the steric hindrance imposed by the branches. Thus, this polymeric structure shows a significant elastic response only at moderate temperatures where close packing occurs and secondary bonds are still strong. At higher temperatures, the structural pattern becomes more random and only weakened secondary bonds and a small amount of long chain entanglement remains to contribute to elastic recovery. On the other hand, in linear polymers, there are few side branches and the polymer chains are considerably longer. The chains appear to loop about one another to form an interlocking structure which does not change appreciably with increasing temperature. Therefore, linear polymers exhibit more elastic recovery at higher temperatures than do branched polymers. The general effect of increasing the temperature is to decrease melt viscosity but the effect is different for different types of polymers. Polar polymers such as polyvinyl chloride which possess high activation energy react more strongly to heat than low activation energy polymers such as polyethylene. As the temperature increases, molecular structure becomes more random and the configurational change of the molecules is more easily altered. Consequently, the amount of energy required for a viscosity change lessens with increasing temperature. As noted above, this effect is more pronounced for branched polymers. The effect of increasing the molecular weight is to increase the Newtonian viscosity and to decrease both the critical shear stress and the critical shear rate for melt fracture to appear and to increase the dependence of viscosity on shear rate. As the molecular weight distribution is broadened the critical shear rate is increased. In other words, one way to postpone the onset of melt fracture in a polymer is to widen the molecular weight distribution by incorporating a number of long branches in the polymer backbone. Conversely, a narrow molecular weight distribution polymer will exhibit a lower critical shear rate and hence will be more prone to melt fracture. The nature, i.e., design, and amplitude of the resulting surface deformations and the conditions at which the melt fractured material must be handled subsequent to extrusion in order to provide that the surface deformations are retained in the finished article are discussed later.

Exemplary of shear rates which are generally encountered in this method are from about 1000 sec.$^{-1}$ to about 100,000 sec.$^{-1}$ at temperatures of from about 10 to about 400° F. in excess of the softening point of said material and are usually within the range of from 25 to 300° F. These conditions can usually be achieved by passing heat softenable materials having melt flow values within the range of from about 0.01 to about 50 (ASTM–D–1238–62T) through a tubular extrusion die having annular clearance of from about 0.0005 to 0.005 inch at rates of from about 0.5 to about 10 inches per second apparent linear flow rate.

The heat softenable materials presently preferred in the production of articles by the use of this method are the synthetic thermoplastics. As a general rule, these polymers can be either crystalline or amorphous as those terms are employed in the art, although it is generally the case that polymers having a substantial amount of crystallinity, i.e., at least about 20 percent, exhibit a more amplified response, i.e., they exhibit a higher degree of melt fracture. Although the melting points of usable polymers within this preferred class vary considerably, e.g., from 221° F. for polyethylenes to in excess of 500° F. for poly(arylene sulfides) and polytetrafluoroethylenes, the extrusion temperatures at which the desired patterned surface deformations associated with melt fracture result can be defined with reasonable accuracy relative to the polymer melting point. As a general rule, the preferred temperatures at which these polymers are subjected to the shearing forces already mentioned, e.g., by extrusion, are within the range of from about 10 to about 400° F. above the softening point of the particular polymer. A more preferred differential temperature range in this regard where the subject polymers are poly-alpha-olefins derived from monomers having from 2 to 8 carbon atoms is from about 25 to about 150° F. above the softening point for parisons and 25–300° F. above softening point for flat extrudates. The melt flow values which should be possessed by all of the polymers within the broad class of synthetic thermoplastics are usually within the range of from about 0.01 to about 50 at the temperature at which they are subjected to the shearing forces described. The more preferred range of melt flow values for the polyolefins is from about 0.1 to about 20 at these temperatures.

For example, commercially available blow molding grade polypropylene polymers having melt flow values in the range of from about 0.1 to about 2.5 (230° C. ASTM–D–1238–62T) can be extruded under conditions of temperature flow rate and die clearance sufficient to produce shear rates in the order of from about 20,000 sec.$^{-1}$ to about 80,000 sec.$^{-1}$ with the resultant production of extrudates having relatively small geometrically spaced repeating deformations, e.g., triangular prismatic structures. However, forming parisons from polypropylene polymers having melt flow values below 0.1 are presently considered undesirable due to the extreme conditions necessary to produce extrudates of these highly viscous materials while polypropylene having melt flow values above 2.5 are generally so fluid at extrusion conditions that they do not possess sufficient melt strength to retain the form of the extrudate. In addition, polymers having such high melt flow values, i.e., low melt strength, produce extrudates which are subject to both lateral and longitudinal distortion with the result that the rhythmic surface deformations produced during passage through the die are distorted relative to each other in an uncontrollable manner. Presently preferred propylene polymers have an even somewhat more restricted range of melt flow values for purposes of control and ease of handling.

The melt flow values of these preferred polymers are generally within the range of from about 0.4 to about 2.0 for tubular extrudates such as parisons and up to about 20 for laminar extrudates where lower melt strength can be tolerated. However, the preferred absolute melt flow values for any particular polymer are not necessarily the same as those for any other polymer and the preferred ranges have been found to vary from one polymer to another due to varying combinations of influencing variables already discussed. For example, the preferred melt flow values for ethylene-propylene random and block copolymers have been found to be within the range of from about 0.8 to about 2.0. We have also found that within these melt flow ranges the size of the deformations produced in the surface of an extrudate will vary somewhat with melt flow value; the polymers with lower melt flow values producing larger deformations or prisms at the same conditions of temperature, flow rate and die clearance.

Although these results are produced in all members of a class of polymers such as polyolefins, we have found that various species of the group do not make useful articles for one reason or another. For example, low density polyethylene produces tubular extrudates having only marginal apparent patterned surface structure due to the relatively poor melt strength of the resin. On the other hand, high density polyethylenes can be formed into parts having patterned surface structures although these results are partially masked by the characteristic milky color of the resin which obscures the patterned appearance usually amplified by the reflection and refraction of light by the surface deformations. We have also observed that more stringent temperature requirements must be observed with linear polyethylene. For example, a blow molding grade ethylene homopolymer with a nominal density of 0.96 gram/cc. and a nominal melt index of 0.9 is normally molded at a resin melt temperature of 350 to 370° F. Surface deformations were produced in this resin at temperatures in the range of from 320 to about 340° F. but disappeared below 320° F. Ionic hydrocarbon polymers such as the copolymers of 1-olefins with ethylenically unsaturated acids disclosed in U.S. Pat. 3,264,272 also have sufficient melt strength and intermolecular physical characteristics to produce useful articles of melt fractured extrudates by molding, casting, etc. at controlled conditions which do not result in the destruction or substantial distortion of the surface patterns.

After the extruded preform or finished article has been produced by this procedure, care must be taken in the consideration of conditions at which the article or preform is maintained for the process by reshaping such as molding, casting, etc. to assure the preservation of these surface patterns thus produced to the extent desired. If the heat softenable material is maintained at extrusion temperatures for an excessive period, the distinction of the deformation pattern tends to diminish. This effect is accelerated where the intermediate article is further shaped or supported in operations such as casting or blow molding. For example, we have found that when extruded parisons having melt fractured surfaces are blow molded under the influence of about 40 p.s.i. pressure differential at a parison temperature of 50° F. in excess of the softening point against a mold surface less than 25° F. below the softening point that the definition of the surface pattern on the exterior of the article is substantially diminished. As a result, the outer surface of the resultant articles is relatively smooth while the interior of the article possesses a distinct surface deformation pattern. Where the material employed in the production of such articles is relatively clear, the interior surface patterns refract and reflect light passing through the article side walls with the result that the article is given an attractive patterned appearance although its exterior is substantially free of deformations.

However, this result may not always be desirable since in certain situations it may be preferred to retain the surface deformation pattern on the exterior surfaces of the article as well. This result can be obtained by carefully controlling the temperature of the preform, particularly the temperature of its exterior surface as well as the temperature of the mold surface. It must be observed, however, that it is still necessary to maintain the temperature of a greater part of the preform at a point substantially in excess of the softening point so that it can be conformed to the surface of the mold. Due to the greater variety of heat softenable materials which can be employed in the production of patterned articles by this method the temperatures at which they should be reshaped by molding, casting, etc. is best defined by reference to the softening point of the material and usually falls within the range of from about 10 to about 400° F. above the softening point. Where it is particularly desirable to retain the utmost definition of the deformation pattern on the exterior surface, that surface may be cooled below the average temperature of the preform so as to increase the resistance of that surface to deformation on contact with the mold surface or casting surface and the like. For example, this can be accomplished by contacting the exterior surface of a parison with a cooling medium at a temperature and rate sufficient to rapidly reduce the temperature of that surface to a point slightly below the softening point of the material, e.g., about 5° F. below its softening point. As a result of this procedure, sufficient reduction or surface temperature can be obtained so that the exterior surface will be at a temperature approximately equal to or only slightly in excess of the softening point at the time that it is conformed to the mold surface by virtue of heat transfer between the interior of the preform, e.g., parison, and the exterior surface.

In addition to the necessity of maintaining a preform at a temperature sufficient to retain the desired surface pattern definition, the preform melt strength must be sufficient to prevent any undesired distortion of the preform. The preferred melt flow values will, of course, vary somewhat with the particular class of heat softenable material involved. For example, where polyolefins of the described class are employed the preferred melt flow values are generally within the range of about 0.1 to about 20 under the conditions, e.g., at the temperature, at which reshaping by casting, molding, etc. is to be effected.

We have also found that a variation of the deformation pattern that is produced by subjecting the heat softenable materials to the shearing forces discussed can be obtained by stretching the intermediate product, i.e., extrudate, in any one of several manners either before or after the intermediate preform is cooled to a temperature below its softening point. This procedure is particularly desirable in the manufacture of articles from the preferred class of thermoplastics above referred to. For example, a parison having the described melt fracture pattern can be blow molded in a manner already referred to with the result that the side walls of the preform, i.e., parison, are stretched. Due to the variations in thickness present in the side walls of the preform by virtue of the existence of deformations which are for the most part portions of the side wall thicker than those areas of the side wall which separate the deformations, this stretching action tends to elongate the intermediate, i.e. thinner, portions of the side wall to a greater extent than the deformed or thicker parts. The definition of the deformations which usually have the form of small triangles or parallelograms is retained to a remarkable degree throughout this procedure with the result that the spacing between deformations becomes more pronounced thereby giving the finished article a speckled appearance due to the presence of the relatively small discrete deformations separated by thinner side wall portions arranged in a geometric pattern. We have found that this pattern will be distorted if care is not taken to provide a uniform degree of stretching or elongation of the finished article in any given direction throughout the length of the article. However, this result may not be totally unsatisfactory in some instances and may be preferred in certain situations to obtain a patterned effect that varies in size, i.e., spacing between deformations, over the face of a finished article.

As a result of this observation, it is possible to vary the pattern possessed by a finished article by modifying the size differential between the preform and the final product. For example, two blow molded articles, e.g., bottles, produced from preforms, e.g., parisons, sheetstock, etc., of different original dimensions will possess patterns exhibiting different spacing and size of the surface deformations. The spacing and size of the deformations on the finished article produced from the smaller preform will be greater than those possessed by the article produced by the larger preform. This same effect results in other methods of article fabrication which involves the subsequent distortion or elongation of the preform to produce the final product. For example, free blown film can be produced from these extrudates with the result that the spacing between deformations will be greatly increased. These deformations are relatively close together as observed in the extrudate prior to distortion and appear to be separated only by fine linear fractures which are usually disposed at an angle other than 90° to the direction of flow, i.e., direction in which the preform is extruded. The material in these thinner side wall portions, i.e., at the fractures, is stretched or elongated to a much greater degree during these subsequent operations such as blow molding and free blowing of film with the result that the separation between the thicker portions of the side wall, i.e., deformations, is greatly increased as already mentioned. The change in this dimension—the space between deformations—results in a definite modification of the appearance of the pattern in the finished article although the deformations themselves, i.e., the thicker side wall portions, are also subjected to some enlargement. However, the enlargement of the deformations is substantially less than the elongation of the thinner side wall material between the deformations due to the greater thickness and resistance to stress of the thicker side wall portions.

Similar results are also obtained by stretching sheetstock, tubular shapes or other extruded or cast preforms, at temperatures above or below the softening point of the material. It is also possible in the treatment of such articles below their softening points to provide that the side wall material between the thicker portions or deformations are oriented to a much greater degree than the material in the thicker side wall portions by virtue of the greater degree of elongation which results in the thinner parts separating these deformations. This procedure is advantageous in the production of sheet materials, tubular articles and the like having surface patterns of different dimensions as desired. However, it can also be employed to produce discrete particles of the heat softenable material which approximate the dimensions of the surface deformations. This result can be accomplished with highly orientable thermoplastics by stretching the material a sufficient amount at a temperature within the range of temperatures at which the material can be oriented to enable the subsequent destruction of the thinner, highly oriented side wall portions in a manner analogous to fibrillation as described in U.S. Pats. 3,336,174 and 3,177,557. These orientation temperatures exist below the softening point of the thermoplastic and are usually within the range of from about 150 to about 600° F. for most thermoplastics. As described in the patents referred to, the temperatures at which orientation can be effected will, of course, vary with the type of polymer employed. For example, the preferred range of orientation temperatures for high density polyethylenes having melt flow values (ASTM D–1238–62T) of about 0.1 to 20 are from about 150 to about 250° F.; for polypropylenes having melt flow values of about 0.1 to about 15 are from about 150 to about 300° F.; and for homopolymers of 4-methyl-1-pentene having melt flow values within the range of 0.1 to 15 are in the range of from 150 to 400° F. The degree of elongation required to accomplish this result, for example, the fracture of the thinner, more highly oriented side wall portion, under the influence of acute angular bending as described in the patents referred to will also vary considerably with the type of polymer employed. This elongation is usually defined by reference to draw ratio which is the ratio between the final and initial length of a given article and are preferably from 3/1 to 14/1 for the high density polyethylenes, from 3/1 to 14/1 for the polypropylenes, and from 3/1 to 14/1 for the 4-methyl-1-pentene polymer referred to. The subdivided products resulting from this procedure are useful for a number of purposes. For example, the minute size of the resultant particles greatly facilitates their use in polymer blending operations in which a greater degree of subdivision accelerates the rate of polymer dispersion.

Referring now to the drawings, the figure illustrates one form of extrusion die that can be employed.

In the figure, heat softened material such as molten thermoplastic is forced into cavity 10 in a direction indicated by arrow 2 from such means as an extruder upstream of the die (not shown in the figure). This material is then forced through the minimum clearance between the lower edge 7 of choke ring 6 and the point of least diameter 11 of cavity 10 which, in combination with the straight land portion of mandrel 9 and bushing 12, determine existing shear rates at a given set of process conditions, e.g., flow rates, temperatures, etc.

One form of apparatus suitable for the production of the articles of this invention is illustrated in the figure. This apparatus is a straight land die comprising die bushing 1 containing mandrel 3 which comprises straight land portion 9, choke ring or collar 6 and threads or other fastening means 5 for securing the mandrel to adjustable retaining means for maintaining the position of the lower edge 7 of choke ring 6 in a predetermined disposition to the lower end of cavity 10 and the upper end of the straight land portion 9.

Although the particular type of die design necessary to obtain the required shear rates is not critical, we have determined that the control necessary to attain the preferred repetitive surface discontinuities, i.e., surface patterned effect, and to retain that effect in the extrudate is more easily accomplished in a straight land die such as that illustrated in the figure. The central passage 4 through mandrel 3 is not a necessary feature of this apparatus and was provided in this embodiment to allow the passage of blowing fluid into the interior of a parison extruded by this apparatus for the production of the blow molded articles prepared in the illustrative examples. Blow molding procedures per se are not, per se, the express subject of this invention and are discussed in detail in U.S. Pats. 2,783,503 and 3,029,468.

The clearance between the lower portion of the choke ring 7 in the minimum diameter of the cavity 11 will determine the maximum shear rates attained in this apparatus for the given polymer and a given set of process conditions such as flow rates, temperatures, and the like. For example, at lower flow rates it is necessary to reduce the clearance at this restricted passage in order to attain the same shear rate for any given polymer at any given set of processing conditions aside from mass flow rate in order to obtain the patterned surfaces referred to. However, such procedures result in the production of an extrudate having thinner walls which should be taken into account in prescribing the clearance between the straight land portion of the die.

The apparatus of the figure can be modified and/or operated in a manner so as to further vary the characteristics of extrudates produced by its use. For example, the clearance between choke ring 6 and the minimum diameter of die bushing 1 can be varied by reciprocating mandrel 3 during the production of the discrete extrudate thereby varying the shear rates to which various portions of the extrudate are subjected during extrusion. By this procedure, an extrudate exhibiting surface deformations in one portion and having planar non-deformed surfaces in yet another portion can be produced by this apparatus. In the alternative, the maximum diameter of the choke ring 6 can vary around the circumference of the mandrel so that shear rates at different radial positions will vary from the shear rates existing at other positions around the restricted passage between the lower portion of choke ring 7 and the minimum diameter of bushing 11. In other words, the apparatus can be designed so that the minimum clearance between the choke ring and bushing varies around the circumference of the annular passage by varying either the construction of the choke ring or the interior minimum diameter of the bushing 11 so that different shear rates exist at given points in the restricted annular passage. However, this procedure suffers the disadvantage of making straight parison drop control more difficult. It is also possible to produce extrudates and resulting articles having helical or other patterned bands or sections by rotation of the modified choke ring during extrusion, or by a combination of rotation, reciprocation, etc. depending on the pattern desired.

SPECIFIC EXAMPLE

An ethylene-propylene random copolymer having the properties indicated in the following table was plasticized in a 1½-inch Modern Plastics Machinery Company extruder equipped with a two-stage screw.

TABLE

| Property | ASTM test | Value |
| --- | --- | --- |
| Density | D-1505-60T | 0.900 gms./cc. |
| Melt flow (Cond. L) | D-1238-62T | 1.5. |
| Melting point | | 305° F. |
| Softening point | D-1525-58T | 283° F. |

The melt temperature was raised to and maintained at about 400° F. at the point of the restricted annular passage illustrated in the figure having a mean diameter of 0.71 inch and a clearance of 0.002 inch. Mass flow rate was maintained at 2 grams/second which produced an apparent flow rate through the restricted die annulus of ~1 inch/second and a shear rate of approximately 40,000 reciprocal seconds. The land length of the die employed in this example was 0.50 inch.

This later variable, i.e., land length, is generally considered to have little effect on the extent in degree of melt fracture although it can have a substantial influence on the clarity and distinctness of the surface deformations which result in a finished article produced from extrudates obtained from the die. For example, if the annular clearance in the straight land portion of the die is not sufficiently greater than the annular clearance at the restricted passage between mandrel collar 6 and the die bushing at its restricted diameter 11 as illustrated in the figure, the extruded material will be forced to conform to the planar inner surfaces of the straight land portion thereby distorting the impression of the surface deformations or destroying them altogether by forcing the material to conform to a homogeneous mass. As a result, it is desirable, as in this example, to provide that the annular cross-section in the straight land portion of the die exceed the minimum annular cross-section between the mandrel and the die bushing by an amount sufficient to insure that the added thickness of the extrudate caused by the surface deformations does not exceed the annular cross-section in the straight land portion.

Parisons produced by this method were blow molded in accordance with the method of Sherman as discussed in U.S. Pat. 2,783,503 to produce bottles having patterned surfaces. During this procedure the temperature of the extruded article, i.e., parison, was maintained at a point about 50–100° F. above the softening point of the ethylene-propylene copolymer, i.e., 283° F., while the temperature of the side walls of the mold was maintained at about 40–50° F. The extruded parisons having ~0.04 inch thick side walls and being ~2.4 inches in circumference were conformed to the side walls of the mold (6.2 to 7.1 inch circumference) under a pressure of 40–80 p.s.i.g., at the above-noted temperatures with the result that the surface deformations in the outer surface of the parison were substantially reduced thereby providing the finished article with a relatively smooth outer surface. However, the parison and mold temperatures, blowing fluid pressure and temperature (75° F.) were such that the interior portion of the parison was cooled in the area of or slightly below its softening point with the result that the surface deformations on the interior of the article were preserved during the molding operation. As a result, the finished articles have regular repeating deformations on their interior surfaces which refract and reflect light passing through the articles.

By cooling the outer surface of the parison to a temperature approximately 5–50° F. above the softening point of the parison material prior to forming the finished article, the surface deformations on the exterior surface can be substantially preserved with the result that the finished article will be provided with the repeating geometric patterns of surface deformations on both the exterior and interior surfaces. This should be accomplished without cooling the preform substantially below its softening point so as to enable the desired shaping of the preform. Similar considerations of molding temperature, i.e., extrudate or preform temperature and mold surface temperature, are taken into account in the preparation of extruded or cast articles, e.g., sheetstock material and solid molded objects, and free blown materials, e.g., films, from heat softenable materials.

Air cooling can be used in both the inner and outer parison walls to accomplish this but if too much cooling or uneven cooling occurs a poorly shaped or useless article results on blowing. The preform must be fluid enough to stretch without fracturing or splitting. It should be noted that the irregularities will persist but not be as obvious even when no effort is made to preserve them. This knowledge is gained from blowing marred polypropylene parisons to form oriented bottles at about the softening point in a heating cycle.

We claim:
1. A method for producing patterned articles of heat softenable viscoelastic pseudoplastics which comprises:
 (a) extruding said material through a restricted cross-section (1) at a first temperature above the softening point of said material but below the temperature at which said material would flow so substantially that deformations in the surface of the said material would not be retained and (2) at a flow in excess of the critical strain rate of said material at said temperature to produce turbulent flow of said material and deformation of portions of said material relative to the normal travel thereof through said restricted cross-section;
 (b) under the influence of a differential pressure between the opposite surfaces of said material conforming the resultant, deformed, extruded material to a predetermined shape at a second temperature sufficiently above the softening point to permit flow into the predetermined shape but wherein at least one deformed surface remains below the temperature at which under the influence of the weight of the material the flow would be so substantial that melt fracture induced deformation of the surface would not be retained; and
 (c) reducing the temperature of said material to the point below the softening point to produce a patterned article in said conformed shape.
2. The method of claim 1 wherein said material is selected from natural and synthetic elastomers and thermoplastics.

3. The method of claim 1 wherein said first temperature is dependent on the physical properties of the particular viscoelastic pseudoplastic material but is within the range of from about 10 to about 400 Fahrenheit degrees in excess of said softening point and said second temperature is dependent on the physical properties of the particular viscoelastic pseudoplastic material but is within the range of from about 5 to about 50 Fahrenheit degrees above said softening point.

4. The method of claim 1 wherein said material is selected from polymers of at least one alpha-olefin having from 2 to 8 carbon atoms, said polymer having a melt flow value within the range of from about 0.1 to about 20.

5. The method of claim 1 wherein the degree and extent of said turbulence is varied by varying said flow rate of said material during said extrusion.

6. The method of claim 5 wherein said flow rate is varied by varying said cross-section available to flow to produce variations in said deformations along the longitudinl axis of said extrudate.

7. The method of claim 1 wherein said extruded material is conformed to the surface of a mold.

8. The method of claim 7 wherein said material is conformed to said mold at a pressure and temperature sufficient to substantially reduce the amplitude of said deformations on the surface of the said material adjacent said mold surface.

9. The method of claim 1 wherein said material is selected from polypropylene and random and block ethylene-propylene copolymers.

10. A method according to claim 9 wherein said first temperature of the polymer was maintained at about 400° F., said restricted cross-section had a mean diameter of 0.71 inch and a clearance of 0.002 inch, the mass flow rate of polymer was maintained at 2 grams/second which produced an apparent flow rate through the restricted die annulus of approximately 1 inch/second and a shear rate of approximately 40,000 reciprocal seconds, and with the further proviso that the land length of the die was 0.50 inch and wherein said second temperature was maintained in the range of about 333° F. to about 383° F., but the interior surface of the preform was maintained at 283° F. or a lower temperature so that a conformed patterned shape is produced.

References Cited
UNITED STATES PATENTS

| | | | |
|---|---|---|---|
| 3,398,428 | 8/1968 | Fuerst et al. | 264—98 |
| 3,415,796 | 12/1968 | Souder et al. | 264—209 |
| 3,446,884 | 5/1969 | Miller et al. | 264—209 |

OTHER REFERENCES

McKelvey, Polymer Processing, John Wiley & Sons Inc., New York, pp. 85-97.

ROBERT F. WHITE, Primary Examiner

G. AUVILLE, Assistant Examiner

U.S. Cl. X.R.

264—209, 294, 322